United States Patent [19]

von Au et al.

[11] Patent Number: 4,489,201

[45] Date of Patent: Dec. 18, 1984

[54] FLUOROALKYLOXYLAKYL CONTAINING ORGANOPOLYSILOXANES

[76] Inventors: Günter von Au, Paganiniweg 8; Ernst Innertsberger, Mehringer Strasse 56, both of 8263 Burghausen; Jakob Schmidlkofer, Ahornweg 3, 8261 Mehring-Öd; Wolfgang Kaiser, Robert-Koch-Strasse 134, 8263 Burghausen, all of Fed. Rep. of Germany

[21] Appl. No.: 553,950

[22] Filed: Nov. 21, 1983

[30] Foreign Application Priority Data

Dec. 29, 1982 [DE] Fed. Rep. of Germany ....... 3248535

[51] Int. Cl.³ .............................................. C08G 77/24
[52] U.S. Cl. ...................................... 528/42; 528/21; 528/23; 528/33; 556/448; 556/445; 556/454
[58] Field of Search ........................ 556/448, 445, 454; 528/42, 33, 21, 23

[56] References Cited

U.S. PATENT DOCUMENTS

| | | | |
|---|---|---|---|
| 3,132,117 | 5/1964 | Schmidt | 528/42 |
| 3,331,813 | 7/1967 | Pittman et al. | 528/42 |
| 3,639,156 | 2/1972 | Pittman et al. | 528/42 |
| 3,772,346 | 11/1973 | Hess | 556/448 |

*Primary Examiner*—Melvyn L. Marquis

[57] ABSTRACT

This invention relates to fluoroalkyloxyalkyl diorganopolysiloxanes having the general formula

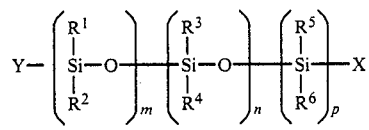

where $R^1$ represents fluoroalkyloxyalkyl groups of the general formula

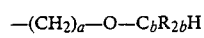

in which the hydrogen atom is in the beta position to the ether oxygen, a is 2, 3 or 4; b is an integer having a value of from 1 to 6; $R^2$ represents an alkyl group having from 1 to 8 carbon atoms whose terminal units may also contain an amino or a thiol group, or an alkenyl group having 2 or 3 carbon atoms, or an aryl group having from 6 to 8 carbon atoms or hydrogen; $R^3$ represents the group having the formula

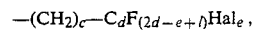

in which Hal represents a terminal chlorine, bromine or iodine atom, c is 2, 3 or 4; d is an integer having a value of from 1 to 18; e is 0 or 1; $R^4$, $R^5$ and $R^6$ are the same as $R^2$; X and Y are the same or different and represent condensable terminal groups or trialkylsiloxy groups in which the alkyl groups have from 1 to 6 carbon atoms; m has a value of from 0.05 to 0.9; n has a value of from 0 to 0.6; and p has a value of from 0.1 to 0.8 with the proviso that the sum of $m+n+p=1$.

4 Claims, No Drawings

FLUOROALKYLOXYLAKYL CONTAINING ORGANOPOLYSILOXANES

This invention relates to organopolysiloxanes, and more particularly to fluoroalkloxyalkyl containing diorganopolysiloxanes.

BACKGROUND OF THE INVENTION

Fluoroalkyloxyalkyl silanes and polymers derived therefrom which could be used as hydrophobization agents and as antifoaming agents have been described in German Patent Application P 31 38 236.

In contrast to the fluoroalkyloxyalkyl silanes described in the German patent application, this invention relates to diorganopolysiloxanes containing fluoroalkyloxyalkyl groups and compositions containing the fluoroalkyloxyalkyl containing diorganopolysiloxanes. The fluoroalkyloxyalkyl containing diorganopolysiloxanes of this invention can be employed, for example, as coating agents, as antifoaming agents and as lubricants. When compared with the diorganopolysiloxanes which have or could have been used heretofore for such purposes, the fluoroalkyloxyalkyl containing diorganopolysiloxanes of this invention exhibit improved solvent stability, improved swelling properties and especially under elevated mechanical stress, improved effectiveness as a lubricant.

Therefore, it is an object of the present invention to provide fluoroalkyloxyalkyl containing diorganopolysiloxanes. Another object of the present invention is to provide fluoroalkyloxyalkyl containing diorganopolysiloxanes having improved lubricating properties. Still another object of the present invention is to provide fluoroalkyloxyalkyl containing diorganopolysiloxanes which are resistant to solvents.

A further object of the present invention is to provide fluoroalkyloxyalkyl containing diorganopolysiloxanes which may be used as antifoaming agents.

SUMMARY OF THE INVENTION

The foregoing objects and others which will become apparent from the following description are accomplished in accordance with this invention, generally speaking, by providing fluoroalkyloxyalkyl containing diorganopolysiloxanes of the formula

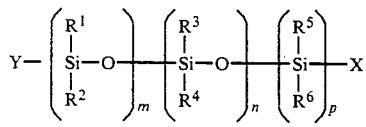

where $R^1$ represents a fluoroalkyloxyalkyl group having the general formula

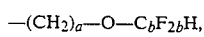

where the hydrogen atom is in the beta position relative to the ether oxygen; a is 2, 3 or 4; b is an integer having a value of from 1 to 6; $R^2$ represents an alkyl group having from 1 to 8 carbon atoms whose terminal units may also include an amino or a thiol group, an alkenyl group having 2 or 3 carbon atoms, an aryl group having from 6 to 8 carbon atoms or hydrogen; $R^3$ represents a group having the formula

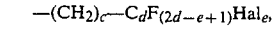

where Hal represents a terminal chlorine, bromine or iodine atom; c is 2, 3 or 4; d is an integer having a value of from 1 to 18; e is 0 or 1; $R^4$, $R^5$ and $R^6$ are the same as $R^2$; X and Y which are the same or different, represent condensable terminal groups or trialkylsiloxy groups in which the alkyl groups have from 1 to 6 carbon atoms; m has a value of from 0.05 to 0.9; n has a value of from 0 to 0.6; p has a value of from 0.1 to 0.8 with the proviso that the sum of $m+n+p=1$.

DESCRIPTION OF THE INVENTION

In the fluoroalkyloxyalkyl containing diorganopolysiloxanes represented by the above formula, $R^1$ may be 1,1,2,2-tetrafluoroethoxyethyl, 1,1,2,2-tetrafluoroethoxypropyl, 1,1,2,2-tetrafluoroethoxybutyl, (2-hydro-hexafluoropropyl)-oxyethyl, (2-hydro-hexafluoropropyl)-oxypropyl, (2-hydro-hexafluoropropyl)-oxybutyl, (2-hydro-octafluorobutyl)-oxyethyl, (2-hydro-octafluorobutyl)-oxypropyl, (2-hydro-octafluorobutyl)-oxybutyl, (2-hydro-decafluoropentyl)-oxyethyl, (2-hydro-decafluoropentyl)-oxypropyl, (2-hydro-decafluoropentyl)-oxybutyl, (2-hydro-dodecafluorohexyl)-oxyethyl, (2-hydro-dodecafluorohexyl)-oxypropyl, and (2-hydro-dodecafluorohexyl)-oxybutyl.

Examples of $R^2$, $R^4$, $R^5$ and $R^6$ groups are hydrogen and alkyl radicals such as the methyl, ethyl, propyl, n-butyl, n-pentyl, n-hexyl, n-heptyl, n-octyl; aminoalkyl radicals such as aminomethyl, aminoethyl, aminopropyl and aminopentyl radicals; thiol groups such as mercaptomethyl and mercaptoethyl groups; alkenyl groups such as vinyl and allyl radicals and aryl groups such as the phenyl, tolyl and xylyl radicals.

Examples of groups represented by $R^3$ are (trifluoromethyl-ethyl), (trifluoromethyl-propyl), (trifluoromethyl-butyl), perfluoroethyl-ethyl), (perfluoroethyl-propyl), (perfluoroethyl-butyl), (perfluorooctyl-ethyl), (perfluorooctyl-propyl), (perfluoropropyl-butyl), (perfluorobutyl-ethyl), (perfluorobutyl-propyl), (perfluorobutyl-butyl), (perfluorodecyl-ethyl), (perfluorodecyl-propyl), (perfluorodecyl-butyl), (perfluorohexyl-ethyl), (perfluorohexyl-propyl), (perfluorohexyl-butyl), [(w-chloro-dodecafluorohexyl)-ethyl], [(w-bromo-dodecafluorohexyl)-ethyl], (perfluorododecyl-ethyl), (perfluoroquatordecyl-ethyl), (perfluorohexadecyl-ethyl) and (perfluorooctadecyl-ethyl).

Eamples of terminal groups represented by X and Y are trimethylsiloxy and triethylsiloxy groups; condensable groups, such as hydrogen and the OH group; alkyloxy groups having from 1 to 5 carbon atoms, especially the methoxy, ethoxy, propyloxy, n-butyloxy, n-pentyloxy, as well as alkoxyalkyl groups such as the ethoxymethyleneoxy group.

Preferred examples of the $R^1$ groups are 1,1,2,2-tetrafluoroethoxypropyl and (2-hydroxy-hexafluoropropyl)-oxypropyl groups. The methyl group is the preferred example for the $R^2$, $R^4$ and $R^5$ radicals. The perfluorohexyl-ethyl grouup is the preferred radical for the $R^3$ group.

The organopolysiloxanes of this invention are prepared by the hydrolysis or the co-hydrolysis of the silanes and the subsequent condensation or equilibration of the resultant hydrolysates.

Generally, the process of this invention is carried out by hdrolyzing silanes having the formula $R^1R^2SiCl_2$, $R^5R^6SiCl_2$ and optionally $R^3R^4SiCl_2$ in an aqueous system, preferably in 3 to 30 percent by weight of sodium hydroxide. The silane is preferably added to the aqueous system. In principle, the silanes can be hydrolyzed separately or together as a silane mixture and in the desired molar ratio. Occassionally the so-called "gradient hydrolysis" process is used, in which a hydrolysate of a silane or a silane mixture is co-hydrolyzed in a second hydrolysis stage together with at least one additional silane. Hydrolysis reactions are customarily performed at temperatures between 20° and 80° C. and under atmospheric pressure. The hydrolysates are isolated by separating the aqueous phase and by purifying the hydrolysate by neutralization, extraction, vacuum drying or by other techniques known in the art.

The condensation or equilibration of the hydrolysate or hydrolysates is generally achieved in the absence of a solvent and in the presence of condensation or equilibration catalysts. Examples of suitable catalysts are phosphoronitrile chlorides, quaternary ammonium salts and quaternary ammonium hydroxides such as tetramethylammonium hydroxide, benzyltrimethylammonium hydroxide and similar compounds. The catalysts are generally employed in an amount of from 10 to 300 ppm by weight, based on the total weight of the components of the reaction. The reaction temperatures are generally between 80° and 120° C. It is preferred that the process be carried out under reduced pressure, for example, in the range of from 0.5 to 15 Torr. The condensation or equilibration reactions take place with practically quantitative results, so that the proportion of the individual reactive substances employed is reflected by the molar ratio of the individually desired structural units in the resultant condensate or equilibrated product. After the desired degree of condensation or equilibration has been achieved, the reactions are terminated by deactivating the catalyst. The catalyst may be deactivated by the addition of amines, for example, triisononylamine, or by heating to temperatures between 130° and 150° C., especially when quaternary ammonium hydroxides are used as the equilibration catalysts. Often, "monofunctional" silanes such as trialkylchlorosilanes are added to terminate the condensation or equilibration reactions.

The fluoroalkoxyalkyl containing organopolysiloxanes of this invention may consist of block copolymers, i.e., the individual structural elements are present as contiguous blocks, or they may be present in the form of copolymers wherein the individual structural elements are randomly distributed. A random distribution is preferred.

Furthermore, the organopolysiloxanes of this invention may also contain such structural elements as are obtained by the equilibration of small amounts, for example 1 to 2 percent by weight based on the total weight of the organopolysiloxane of phenols, such as tertiary butyl and tertiary octylphenol.

The organopolysiloxane of this invention generally have viscosities in the range of from 30 to 100,000 mm$^2$/s and preferably from 100 to 10,000 mm$^2$/s. When they contain reactive groups, they may be used in preparing elastomers and resins.

The organopolysiloxanes of this invention may be used as hydrophobization agents, as oleophobization agents, as textile adjuvants, and especially as lubricants and antifoaming agents. When the organopolysiloxanes are used as lubricants, they can be subjected to elevated mechanical and thermal stress.

Elastomers prepared from the organopolysiloxanes of this invention can for example be used as sealing and coating compositions.

The following examples will further illustrate the invention; however, they should not be construed as limiting the scope of the invention which is delineated in the claims.

EXAMPLE 1

(a) About 687 ppm of a 15 percent by weight aqueous sodium hydroxide solution were placed in a 2 liter three-necked flask equipped with a stirrer, dropping funnel and a reflux condenser. Over a period of one hour, a mixture consisting of 115 gm of (n-perfluorohexyl-ethyl)-methyldichlorosilane, 136.5 gm of (1,1,2,2-tetrafluoroethyl-oxypropyl)-methyldichlorosilane and 64.5 gm of dimethyldichlorosilane was added dropwise. The temperature of the reaction mixture increased to 80° C. After stirring for an additional 15 minutes, the phases were separated. The final product was then neutralized by washing with water and dried at 70° C. and at 1 Torr. About 216 gm (85 percent of theory) of a cohydrolysate containing an OH group in each of its terminal units were obtained. Viscosity: 170 mm$^2$/sec.

(b) About 217 gm of the cohydrolysate prepared in (a) above and 9 gm of a silicone oil which was end-blocked with trimethylsiloxy groups and which contained 10 dimethylsiloxy groups, were mixed with 0.136 ml of a 25 percent by weight solution of $(PNCl_2)_x$ in methylene chloride and stirred for 3 hours at 100° C. and at a pressure of 1 Torr. The mixture was then removed, mixed with 0.271 ml of triisononylamine and heated for 15 minutes to 130° C. at 1 Torr in order to remove the volatile constituents.

A 95 percent yield of clear oil was obtained. Viscosity: 5,000 mm$^2$/sec. Refractive index $n_D^{20}$ 1.3730.

The product showed a random distribution of the individual structural elements, with 40 mol percent being dimethylsiloxy units, 20 mol percent of (perfluorohexyl-ethyl)-methylsiloxy units and 40 mol percent of (1,1,2,2-tetrafluoroethyloxypropyl)-methylsiloxy units.

EXAMPLE 2

(a) About 533 gm of a 15 percent by weight aqueous sodium hydroxide solution were placed in a 3-necked flask similar to that used in Example 1(a) above and then 273 gm of (1,1,2,2-tetrafluoroethyl-oxypropyl)-methyldichlorosilane were added dropwise over a period of 20 minutes. After stirring for an additional 15 minutes, the phases were separated and the desired product was neutralized by washing with water. The product was subsequently dried at 100° C. and at a pressure of 1 Torr. About 246 gm of hydrolysate was obtained (90 percent yield) which contained an OH group in each of its terminal units and which had a viscosity of 200 mm$^2$/sec.

(b) About 218 gm of the hydrolysate obtained in accordance with 2(a) above, 74 gm of a dimethylpolysiloxane having an OH group in each of its terminal units and having a viscosity of 100 mm$^2$/sec. and 3 gm of a trimethylsiloxy end-blocked dimethylpolysiloxane having a viscosity of 20 mm$^2$/sec. were equilibrated in a vacuum sealed mixer at 100° C. and at a pressure of 1 Torr, in the presence of 0.1 ml of a 40 percent by weight methanol solution of benzyltrimethylammonium hydroxide. Three hours later 0.2 ml of trimethylchlorosilane was added to the reaction mixture. After mixing for an additional 15 minutes, the product was maintained under a pressure of 1 Torr and at a temperature of 130° C. for an additional 2 hours.

An equilibrated product having a viscosity of 5000 mm²/sec. and having a refractive index of $n_D^{20} = 1.3920$ was obtained at a yield of 98 percent. The product had a random distribution of 50 mol percent of (1,1,2,2-tetrafluoroethyloxypropyl)-methylsiloxy groups and 50 mol percent of dimethylsiloxy groups.

EXAMPLE 3

(a) The procedure described in Example 1(b) above was repeated to prepare a cohydrolysate consisting of 185 gm of (n-perfluorohexylethyl)-methyldichlorosilane, 109 gm of (1,1,2,2-tetrafluoroethyl-oxyethyl)-methyldichlorosilane and 52 gm of dimethyldichlorosilane.

The yield was 270 gm (96 percent of theory). Viscosity: 200 mm²/sec. Refractive index $n_D^{20} = 1.3640$.

(b) About 210 gm of the cohydrolysate prepared in Example 3(a) above, were equilibrated with 9 gm of a silicone oil which was end-blocked with trimethylsiloxy groups and which contained 10 dimethylsiloxy groups, in the presence of 0.073 ml of a 26 percent by weight solution of $(PNCl_2)_x$ in methylene chloride, in accordance with the procedure described in Example 1(b) above. The equilibrated product which was obtained in a 95 percent yield, was then mixed with 2.2 gm of tert-octylphenol and 0.073 ml of a 25 weight percent solution of $(PNCl_2)_x$ in methylene chloride and stirred for 2 hours at 150° C. and at a pressure of 1 bar. The equilibration catalyst was then deactivated by the addition of 0.29 ml triisononylamine and then the volatile constituents were removed by stirring at 130° C. under a pressure of 1 Torr for an additional 15 minutes. The final product consisted of a clear oil having a viscosity of 5,000 mm²/sec. and a refractive index of $n_d^{20}$ 1.3650. The product has a 1:1:1 random distribution of the individual structural elements consisting of dimethylsiloxy groups, (1,1,2,2-tetrafluoroethyloxypropyl)-methylsiloxy groups and (n-perfluorohexyl-ethyl)-methylsiloxy groups.

The product was then examined for its thermostability and volatility by adding 3 gm samples of the product to pans whose dimensions were such that the specimens had a surface area of 20 cm² and then heated to a temperature of 200° C. After 240 hours, the weight loss of the samples was only 2.2 percent by weight. Even after 1000 hours of this treatment, there was no indication of gel formation.

EXAMPLE 4

(a) About 166 gm of a 15 percent by weight aqueous sodium-hydroxide solution were placed in a 3-necked flask equipped with a stirrer, dropping funnel and reflux condenser, and then 100 gm of (1,1,2,2-tetrafluoroethyl-oxypropyl)-methyldichlorosilane were added dropwise with constant agitation. The hydrolysate was isolated in accordance with the procedure described in Example 1(a) above. The product consisted of 90 gm of a hydrolysate consisting of an OH group in each of its terminal units. Viscosity: 200 mm²/sec.

(b) The method described in Example 4(a) above, was repeated except that 506 gm of (n-perfluorohexyl-ethyl)-methyldichlorosilane were hydrolyzed and isolated. Viscosity: 600 mm²/sec.

(c) About 185 gm of a dimethylpolysiloxane having an OH group in each of its terminal units and having a viscosity of 100 mm²/sec., 406 gm of the hydrolysate described in Example 4(b) above, 68 gm of the hydrolysate described in Example 4(a) above, 19 gm of a trimethylsiloxy end-blocked dimethylpolysiloxane having a viscosity of 5 mm²/sec., and 0.51 ml of a 40 percent by weight methanol solution of benzyltrimethylammonium hydroxide were stirred for 3 hours at a temperature of 100° C. and at a pressure of 1 Torr. The mixture was then removed and 1.16 ml of trimethylchlorosilane were added. After stirring for an additional 15 minutes, the reaction mixture was maintained for 2 hours at a temperature of 130° C. and at a pressure of 1 Torr. The final product was obtained at a yield of 96 percent and consisted of an oil having a viscosity of 1000 mm²/sec. and a refractive index of $n_d^{20}$ 1.3640.

The equilibrated product consisted of 66 mol percent of dimethylsiloxy units, 8 mol percent (n-perfluorohexyl-ethyl)-methylsiloxy units and 26 mol percent (1,1,2,2-tetrafluoroethyl-oxypropyl)-methylsiloxy units.

EXAMPLE 5

About 33 gm of the hydrolysate decribed in Example 4(a) above (viscosity 200 mm²/sec.), 61 gm of the hydrolysate described in Example 4(b) above (viscosity 600 mm²/sec.), 178 gm of a dimethylpolysiloxane having an OH group in each of its terminal units and having a viscosity of 100 mm²/sec., 0.3 gm of a trimethylsiloxy end-blocked dimethylpolysiloxane having a vinylmethylsiloxy group in each fourth unit and having a viscosity of 30 mm²/sec., 0.1 gm of a vinyldimethylsiloxy terminated dimethylpolysiloxane having a viscosity of 100 mm²/sec., and 0.1 ml of a 40 percent by weight methanol solution of benzyltrimethylammonium hydroxide were mixed in a laboratory kneader for 3 hours at a temperature of 100° C. and at a pressure of 1 Torr. The mixture was subsequently removed and 0.2 ml of vinyldimethylchlorosilane was added. The reactive mixture was maintained at a temperature of 130° C. and at a pressure of 1 Torr for an additional 2 hours. A solid polymer having a viscosity of 15,000,000 mm²/sec. was obtained.

In the following Examples the antifoaming properties and the lubricating properties of products obtained in accordance with Examples 1 through 4 were determined. In the following examples the product of Example 1 is identified as "A"; the product of Example 2 is identified as "B"; the product of Example 3 is identified as "C"; and the product of Example 4 is identified as "D". A commercially available fluorosilicone oil containing 90 mol percent of 1,1,1-trifluoropropyl-methylsiloxy units and 10 mol percent of dimethylsiloxy units (viscosity 1000 mm²/sec.) is identified as "V".

EXAMPLE 6

The solubility of the organopolysiloxanes prepared in accordance with Examples 1 through 4 was determined by mixing the products with each of the solvents listed in Table I below so that each sample contained a 5 percent by weight solution of the product.

TABLE I

| Solvent | V | A | B | C | D |
|---|---|---|---|---|---|
| Ethylene glycol | − | − | − | − | − |
| Methylethylketone | + | + | ± | + | ± |
| Methylisobutylketone | + | + | ± | + | ± |
| Benzene | − | − | ± | ± | + |
| Frigen 113 | − | + | + | + | + |
| Isopropanol | − | − | − | − | − |
| Perchloroethylene | ± | − | ± | ± | ± |

TABLE I-continued

| Solvent | V | A | B | C | D |
| --- | --- | --- | --- | --- | --- |
| Ethylglycol acetate | + | ± | + | ± | − |
| Acetic acid ethylester | + | + | ± | − | − |

+ = soluble
± = dispersible or partially soluble
− = insoluble

EXAMPLE 7

The antifoaming properties of the organopolysiloxanes prepared in accordance with Examples 1 through 4 were determined by adding 100 ml of a 2.5 weight percent solution of a trimethylsiloxy end-blocked dimethylpolysiloxane having a viscosity of 1000 mm$^2$/sec. in perchloroethylene to a 250 ml cylinder equipped with a ground glass stopper. In each case these solutions were mixed with 0.25 ml of a 10 percent solution of the samples whose antifoaming properties were to be tested, in a 1:1 mixture consisting of acetic acid ethylester and Frigen 113. The fluorosilicone oil whose antifoaming properties were to be tested was present in an amount of 0.01 percent by weight.

Each of the test mixtures obtained was vigorously agitated 10 times in a vertical direction and subsequently the height of the foam and the time required for the foam to collapse were recorded.

The results are shown in Table II.

TABLE II

| Additive | Foam height after agitation | Foam collapse in sec. |
| --- | --- | --- |
| None (control) | 180 | 60 |
| V | 120 | 15 |
| A | 106 | 11 |
| B | 105 | 5 |
| C | 110 | 7 |
| D | 112 | 10 |

EXAMPLE 8

The antifoaming properties at the boiling temperatures of the oils prepared in accordance with Examples 1 through 4 were tested by heating 250 ml of test solutions obtained in accordance with Example 7, using a one-liter flask equipped with a distillation unit. In each case, 3 boiling stones were used and the mixture was heated to a vigorous boil. The foam formation of the solution under boiling conditions was then evaluated. The results are shown in Table III.

TABLE III

| Additive | Foam level/observations |
| --- | --- |
| None (control) | Immediate excessive foaming at boiling |
| V | 16 mm of foam at boiling, slight decrease in foam level as distillation progresses |
| A | 10 mm of foam at boiling, then relatively large bubbles that burst quickly |
| B | up to 8 mm of foam at boiling, then quick decrease with 2 to 3 mm of foam remaining |
| C | a few separate bubbles at boiling, then practically no foam during distillation |
| D | up to 13 mm of foam at boiling, then decrease in foam formation |

EXAMPLE 9

A Shell-4-ball apparatus was used to determine the lubricating properties of the products prepared in accordance with Examples 1 through 4.

Table IV shows the maximal load as the VAK welding power (according to German Industrial Standard DIN 51350), at which the test balls were welded in the apparatus.

TABLE IV

| | VAK Welding Power (N) |
| --- | --- |
| V | less than 2,000 N |
| A | 3,600–3,800 N |
| B | 3,200–3,400 N |
| C | 3,400–3,600 N |
| D | 2,600–2,800 N |

EXAMPLE 10

The lubricating properties of the organopolysiloxanes prepared in accordance with Examples 1 to 4 were tested with the aid of the Almen-wieland Oil Test apparatus. A friction bearing, consisting of two separate bushings and a steel shaft which operated in a bath of the lubricant to be tested, was subjected to a given load and then the friction between the bushings and the shaft was measured. The maximum load applied was 20,000 N and the maximum potential friction was 3,500 N.

In Table V, the lubricating effect is indicated as the friction factor at the maximal load (ratio of frictional force: contact pressure). The lower the factor, the better the lubricating properties.

TABLE V

| Lubricant | Frictional Force | | Contact Pressure | Friction index under maximum load |
| --- | --- | --- | --- | --- |
| V | 1,000 | / | 2,000 | 0.500 |
| A | 3,500 | / | 8,500 | 0.411 |
| B | 3,500 | / | 16,000 | 0.184 |
| C | 3,400 | / | 20,000 | 0.170 |
| D | 3,500 | / | 20,000 | 0.368 |

EXAMPLE 11

The swelling properties of oils obtained in accordance with Examples 1 and 2 were compared with a sealing composition obtained from a diorganopolysiloxane which had been cross-linked at a high temperature and which had a Shore Hardness of 70. The silicone rubber was in the form of a 2 mm thick O-ring gasket with a diameter of 16 mm. The gasket was kept in the test compositions for 100 hours at a temperature of 160° C. The test compositions had been formulated as oils, using lithium stearate to impart consistency. The formulations were selected so that the oils had a consistency of 270 [1/10 mm] as measured pursuant to DIN 51804.

Following the heat treatment, the gaskets were examined in order to determine any increase in their weight and volume. The results are shown in Table VI.

TABLE VI

| Lithium stearate based lubricant | Weight increase in percent by weight | Volume increase in percent |
| --- | --- | --- |
| +V | 0.45 | 2.75 |
| +A | 0.39 | 2.25 |
| +B | 0.33 | 1.93 |

What is claimed is:
1. A diorganopolysiloxane having the general formula

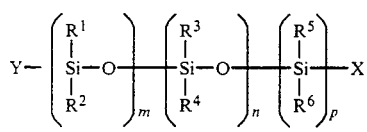

where $R^1$ represents fluoroalkyloxyalkyl groups of the formula $$-(CH_2)_a-O-C_bF_{2b}H$$

in which the hydrogen atom is in the beta position relative to the ether oxygen; a is 2, 3 or 4; b is an integer of from 1 to 6; $R^2$ is selected from the group consisting of an alkyl group having from 1 to 8 carbon atoms, an alkenyl group having 2 or 3 carbon atoms, an aryl group having 6 to 8 carbon atoms and hydrogen; $R^3$ represents the group $$-(CH_2)_c-C_dF_{(2d-e+1)}Hal_e,$$

where Hal represents a terminal halogen group selected from the class consisting of chlorine, bromine and iodine; c is 2, 3 or 4; d is an integer having a value of from 1 to 18; e is 0 or 1; $R^4$, $R^5$ and $R^6$ are each selected from the group consisting of an alkyl group having from 1 to 8 carbon atoms, an alkenyl group having 2 or 3 carbon atoms, an aryl group having 6 to 8 carbon atoms and hydrogen; X and Y are each selected from the group consisting of condensable terminal groups and trialkylsiloxy groups in which the alkyl groups have from 1 to 6 carbon atoms; m has a value of from 0.05 to 0.9; n has a value of from 0 to 0.6; and p has a value of from 0.1 to 0.8; with the proviso that the sum of $m+n+p=1$.

2. The diorganopolysiloxane of claim 1, wherein $R^2$ is an alkyl group having from 1 to 8 carbon atoms and further contains terminal units selected from the group consisting of an amino group and a thiol group.

3. The diorganopolysiloxane of claim 2, wherein $R^4$, $R^5$ and $R^6$ are each selected from an alkyl group having from 1 to 8 carbon atoms and further contains terminal units selected from the group consisting of an amino group and a thiol group.

4. The diorganopolysiloxane of claim 1, wherein $R^2$ is hydrogen and $R^4$, $R^5$ and $R^6$ are each selected from an alkyl group having from 1 to 8 carbon atoms and further contains terminal units selected from the group consisting of an amino group and a thiol group.

* * * * *

UNITED STATES PATENT AND TRADEMARK OFFICE
CERTIFICATE OF CORRECTION

PATENT NO. : 4,489,201
DATED : December 18, 1984
INVENTOR(S) : Gunter von Au et al.

It is certified that error appears in the above-identified patent and that said Letters Patent is hereby corrected as shown below:

On the title page add Item [73]:

--- Assignee: Wacker-Chemie GmbH, Munich, Federal Republic of Germany ---.

In the Abstract:

Change the formula "$(CH_2)_a-O-C_b R_{2b} H$" to read

--- $(CH_2)_a-O-C_b F_{2b} H$ --- .

Claim 1, line 14, the formula

"$-(CH_2)_c-C_d F_{2d-e+1}) Hal_e$"

should be changed to read as follows:

"$-(CH_2)_c-C_d F_{(2d-e+1)} Hal_e$".

Signed and Sealed this

Sixteenth Day of July 1985

[SEAL]

Attest:

DONALD J. QUIGG

Attesting Officer     Acting Commissioner of Patents and Trademarks